United States Patent
Galazin

(10) Patent No.: US 9,630,466 B2
(45) Date of Patent: Apr. 25, 2017

(54) LINK UNIT

(71) Applicant: SAF-HOLLAND GmbH, Bessenbach (DE)

(72) Inventor: Gregory Galazin, Muskegon, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/847,658

(22) Filed: Sep. 8, 2015

(65) Prior Publication Data

US 2016/0075202 A1    Mar. 17, 2016

(30) Foreign Application Priority Data

Sep. 12, 2014   (DE) .................. 10 2014 218 316

(51) Int. Cl.
*B60G 9/00*     (2006.01)

(52) U.S. Cl.
CPC .......... *B60G 9/003* (2013.01); *B60G 2200/30* (2013.01); *B60G 2204/4306* (2013.01); *B60G 2206/8201* (2013.01)

(58) Field of Classification Search
CPC .... B60G 9/003; B60G 9/04; B60G 2204/148; B60G 2204/4306; B60G 2200/30; B60G 2200/31; B60G 2206/82; B60G 2206/8201; B62D 65/12; Y10T 403/32549
See application file for complete search history.

(56) References Cited

U.S. PATENT DOCUMENTS

| | | | | | |
|---|---|---|---|---|---|
| 3,434,707 | A | * | 3/1969 | Raidel | B60G 7/02 267/270 |
| 3,730,508 | A | * | 5/1973 | Marian | B60G 11/113 267/52 |
| 5,375,871 | A | * | 12/1994 | Mitchell | B60G 7/001 280/124.116 |
| 5,857,659 | A | * | 1/1999 | Kato | B60G 7/001 24/20 CW |
| 6,007,058 | A | * | 12/1999 | Kokubo | F16B 17/008 248/634 |
| 6,241,266 | B1 | * | 6/2001 | Smith | B60B 35/04 280/124.116 |
| 6,508,482 | B2 | * | 1/2003 | Pierce | B60G 7/001 280/124.116 |
| 7,360,774 | B2 | * | 4/2008 | Saieg | B60G 7/001 280/124.116 |
| 7,607,670 | B2 | * | 10/2009 | Raidel, II | B60G 9/003 280/124.11 |

(Continued)

FOREIGN PATENT DOCUMENTS

DE   10 2006 009 441         9/2007
DE      102008061190 A1 *    6/2010  ............ B60G 7/001
(Continued)

*Primary Examiner* — Laura Freedman
(74) *Attorney, Agent, or Firm* — Price Heneveld LLP

(57) ABSTRACT

The invention relates to a link unit, in particular for use in utility vehicles, comprising an arm element and a load-bearing element, wherein the arm element has a holding section and the load-bearing element has an engagement section, wherein the holding section and the engagement section can be placed in positively locking engagement such that the load-bearing element is secured against displacement relative to the arm element in at least three holding directions which lie in a holding plane. The invention also relates to a method for producing a link unit.

22 Claims, 2 Drawing Sheets

(56) References Cited

U.S. PATENT DOCUMENTS

| | | | | |
|---|---|---|---|---|
| 7,669,866 B2* | 3/2010 | Peaker | ................... | B60G 7/001 |
| | | | | 280/124.108 |
| 7,726,673 B2* | 6/2010 | Saieg | ..................... | B60G 7/001 |
| | | | | 280/124.116 |
| 7,823,429 B2* | 11/2010 | Drewes | ................ | B21D 26/033 |
| | | | | 72/55 |
| 7,887,073 B2* | 2/2011 | Drewes | ................. | B60G 9/003 |
| | | | | 264/261 |
| 7,954,833 B1* | 6/2011 | Heath | .................... | B60G 9/003 |
| | | | | 280/124.116 |
| 8,226,099 B2* | 7/2012 | Koschinat | ............. | B60B 35/006 |
| | | | | 280/124.116 |
| 8,317,209 B2* | 11/2012 | Aalderink | .............. | B60G 7/001 |
| | | | | 280/124.116 |
| 8,770,604 B2* | 7/2014 | Brereton | ................ | B60G 7/001 |
| | | | | 280/124.108 |
| 2005/0051986 A1* | 3/2005 | Galazin | ................. | B60G 7/001 |
| | | | | 280/124.116 |
| 2009/0072505 A1* | 3/2009 | McGinnis | .............. | B60G 9/003 |
| | | | | 280/124.116 |
| 2016/0107495 A1* | 4/2016 | Spielmann | ............ | B60G 9/003 |
| | | | | 280/124.128 |
| 2016/0176439 A1* | 6/2016 | Spielmann | ............ | B62D 65/00 |
| | | | | 280/124.103 |

FOREIGN PATENT DOCUMENTS

| | | | | |
|---|---|---|---|---|
| DE | 102013210142 A1 * | 12/2014 | ............ | B60G 7/001 |
| JP | H1120435 | 1/1999 | | |
| WO | WO 9706022 A1 * | 2/1997 | ............ | B60B 35/08 |
| WO | WO 9817487 A1 * | 4/1998 | ............ | B60B 35/04 |

* cited by examiner

LINK UNIT

BACKGROUND OF THE INVENTION

The present invention relates to a link unit and to a method for producing a link unit.

Link units, in particular for use in utility vehicles, are already known from the prior art. Here, it is normally the case that a longitudinal link is arranged transversely with respect to an axle tube and is fixed to the axle tube, wherein the longitudinal link, at a first, distal end, is arranged pivotably on the frame of the vehicle and, at its second end situated opposite the first, distal end, is supported on a spring. Here, it has proven to be advantageous for the longitudinal link to be formed in two parts in order, firstly, to improve the handlability of the semifinished parts provided for the assembly process, and secondly, to permit a more variable configuration of the longitudinal link. In this case, the solutions known from the prior art for the connection of the two parts of the longitudinal link are afflicted with numerous disadvantages. For example, in the case of the solutions known from the prior art, a considerable increase in weight of the connecting region between the longitudinal link parts has hitherto been necessary in order to be able to attain the high flexural strengths for a longitudinal link. Furthermore, the production of the connection between the link elements, in particular with regard to the time involved for said production, involves too much expenditure in the cases known from the prior art.

It is an object of the present invention to provide a link unit which firstly permits a high level of variability in terms of the range of application thereof and which is secondly easy to produce and prevents overdimensioning of the running gear of a utility vehicle, in particular with regard to the weight and structural space requirement thereof.

SUMMARY OF THE INVENTION

According to the invention, the link unit comprises an arm element and a load-bearing element, wherein the arm element has a holding section and the load-bearing element has an engagement section, wherein the holding section and the engagement section can be placed in positively locking engagement such that the load-bearing element is secured against displacement relative to the arm element in at least three holding directions which lie in a holding plane. The arm element of the link unit is preferably the elongate section of a longitudinal link of a utility vehicle and is preferably pivotably mounted, at its first, distal end, on the frame of the utility vehicle by way of a pivotable suspension. At its end situated opposite the first, distal end, the arm element can preferably be fixed to an axle tube. The load-bearing element is preferably that section of the longitudinal link of a utility vehicle to which an air spring can be fixed and serves for damping or cushioning the link unit with respect to a frame of the utility vehicle. The arm element and the load-bearing element are in particular placed in positively locking connection with one another by way of a holding section and an engagement section, wherein positive locking is produced between the holding section and the engagement section. Said positive locking preferably acts in a holding plane, and in at least three directions in said plane. Of said three directions, it is preferably the case that two directions run collinearly with and oppositely to one another, and a third holding direction is transverse with respect to the first two holding directions. It is preferable for one of the two sections, holding section or engagement section, to be formed as a projection, whereas the respective other section, engagement section or holding section, is in the form of a recess.

In particular, it is preferably the case here that the respective geometry of the sections are adapted to one another, such that the positive locking between the engagement section and the holding section permits the most precise possible positioning of the load-bearing element on the arm element. The provision of a holding section and of an engagement section on the arm element and on the load-bearing element serves in this case in particular to facilitate the production of the link unit. Accordingly, the load-bearing element can be positioned on the arm element by way of the engagement section, in order for a cohesive connection to preferably subsequently be produced between the arm element and the load-bearing element.

It is preferably provided that, between the holding section and the engagement section, there is formed a welding joint for producing a welded connection between the arm element and the load-bearing element. The engagement region between the holding section and the engagement section is preferably designed such that a welding joint remains between the two components. Said welding joint permits the introduction of an additional welding material during the production of a welded connection between the engagement section and the holding section. It is thus particularly preferably possible for a first welded connection between the arm element and the load-bearing element to be produced in the region of the holding section and of the engagement section, before both components are fixed to an axle tube in a further or subsequent step. The welding joint is particularly preferably accessible from the outside, that is to say the welding joint is provided in particular between an engagement section, which is formed as a recess, and a holding section, which is formed as a projection. The welding joint is particularly preferably a wedge-shaped depression which, in this way, already advantageously predefines the form of a particularly uniform weld seam between the holding section and the engagement section, and thus between the arm element and the load-bearing element, and thereby facilitates the welding process.

It is preferably the case that two of the holding directions run parallel to a tube axis of an axle tube that can be fixed to the arm element. The arm element advantageously has a first welding section to which an axle tube of a utility vehicle can be, and preferably is, fixed. The axle tube is in this case advantageously the rigid axle of a utility vehicle, and has a substantially hollow body-like, elongate cross section. Furthermore, the wheels of the utility vehicle are preferably rotatably mounted on the axle tube. The holding section is advantageously oriented such that two of the holding directions, preferably the holding directions which are configured so as to run collinearly with and oppositely to one another, run parallel to a tube axis of the axle tube. The tube axis is in this case preferably the axis of symmetry of the axle tube and/or the axis of rotation of the utility vehicle wheels that can be fixed to the axle tube. With the advantageous orientation of the two holding directions of the holding section parallel to the tube axis, it is particularly preferably possible to realize particularly simple production of the link unit, as the load-bearing element can already be arranged in the correct position relative to the arm element, in which the transmission of force and transmission of bending moments between the arm element and the load-bearing element is optimized.

The holding section is particularly preferably formed as a projection on the arm element, wherein the engagement section is formed as a recess on the load-bearing element, with which recess the holding section can be placed in substantially positively locking engagement. In the present context, "can be placed in substantially positively locking engagement" refers in particular to a positive locking action which permits freedom of movement of the arm element relative to the load-bearing element in at least one direction. In particular, the projection, together with the engagement section formed as a recess, is designed for the load-bearing element to be hooked onto the arm element, wherein initially, no further assembly steps are required, and the load-bearing element is held on the arm element merely by gravitational force and the positive locking action between the holding section and the engagement section. With this embodiment, the assembly of the link unit is simplified considerably, by way of simple joining-together of the load-bearing element and the arm element.

The holding section advantageously has a first holding surface with which the engagement section can be placed in contact, wherein the holding surface extends transversely with respect to the holding plane. The holding plane is preferably oriented with a slight inclination in space during the assembly of the link unit. In other words, this means that the holding plane is oriented so as to be pivoted through an angle relative to the horizontal. The holding plane is particularly preferably oriented so as to be inclined relative to a straight line or plane running through the region of the pivotable mounting of the arm element and through the mounting region for an axle tube. In the case of this orientation of the holding plane, gravitational force has the effect that the load-bearing element is supported by way of its engagement section on a holding surface of the holding section. Here, it is particularly preferably the case that the holding surface extends transversely, preferably perpendicularly, with respect to the holding plane and thus forms, together with the engagement section of the load-bearing element, an undercut which acts so as to prevent a displacement along or parallel to the holding plane.

It is particularly preferably the case that, between the holding surface and the holding plane, there is formed a holding angle which is less than 91°, is preferably 45°-90°, and is particularly preferably approximately 75°-85°. In this case, the holding angle is preferably formed between the outwardly pointing side of the holding surface and the holding plane. In a further case that is preferably possible, by virtue of the holding surface having a slight curvature, the holding angle is particularly preferably formed between a central planar extent of the holding surface and the holding plane. By virtue of the holding angle being less than 91°, and thus at most 90°, it is possible in a particularly simple manner to form an effective undercut between the engagement section and the holding section. The angle provided is preferably in a range between 45° and 90°, whereby an engagement geometry which acts as a barb is formed between the holding section and the engagement section, permitting particularly reliable fixing or positioning of the load-bearing element on the holding element. In the particularly preferred angle range of 75° to 85°, a good compromise between simple producibility of the holding section and an engagement geometry, which acts at least to a certain extent as a barb, between the holding section and the engagement section is realized. In this way, the load-bearing element can also be more easily be brought together with the arm element, and hooked onto the latter, transversely or preferably perpendicularly with respect to the holding plane. In the case of a holding angle of approximately 75° to 85°, particularly good fixing of the load-bearing element to the arm element is possible within the context of the present invention.

It is particularly preferably the case that the holding surface forms, together with the engagement section, an undercut which acts transversely with respect to the holding plane. Here, it is particularly preferably also possible for the holding surface to be of stepped form, wherein the load-bearing element is initially displaced transversely or perpendicularly with respect to the holding plane in the direction of the arm element, and can subsequently be placed in positively locking engagement with the engagement geometry, which is in the form of a stepped holding surface, of the holding section by way of a small movement parallel to or along the holding plane. In this embodiment, the positively locking engagement between the holding section and the engagement section is particularly preferably capable of withstanding even transportation movements of the link unit during the production process and reliably fixing the arm element to the load-bearing element.

The extent of the holding section parallel to a tube axis is particularly preferably greater than that transversely with respect to the tube axis. The holding section is particularly preferably provided on a region of the arm element which is situated in the vicinity of the fixing of the arm element to an axle tube. It is particularly preferably the case that, in said region, the arm element is of web-like form, wherein the holding section preferably extends along said web. To be able to provide adequately high forces for the fixing of the load-bearing element to the arm element, and to be able to realize an adequately long weld seam between the holding section and the engagement section, it is preferably provided that the extent of the holding section in a direction along or parallel to the holding plane is greater than that in the other direction of extent of the holding section. In this case, the tube axis is preferably the axis of rotation of an axle tube that can be fixed to the arm element, or an axis of symmetry of the fixing region, or preferably welding section, of the arm element for the fixing of an axle tube.

It is particularly preferably the case that the extent of the holding section transversely with respect to the tube axis is 0.1 to 0.85 times, preferably 0.15 to 0.4 times and particularly preferably 0.2 to 0.3 times the extent of the holding section along or parallel to the tube axis. By configuring the holding section with a particular width to length extent ratio of 0.1 to 0.85, the geometry of the holding section can preferably be adapted to all usage scenarios envisaged within the context of the present invention. Here, the lower limit of the ratio of 0.1 ensures an adequate height of the holding section, or an adequate protrusion of the holding section out of the holding plane, which is available for the formation of an undercut or positive locking with the engagement section. The upper limit of the preferred ratio of 0.85 preferably prevents overdimensioning of the holding section. In the particularly preferred ratio range from 0.15-0.4, the holding section is optimally designed for the fixing of load-bearing elements of different size to an arm element and at the same time not unduly increasing the weight of the link unit. The particularly preferred range of 0.2-0.3 of the ratio of the extent of the holding section transversely with respect to the tube axis to the extent of the holding section along the tube axis has, in tests carried out by the applicant, proven to be particularly advantageous with regard to the transmission of force between the holding section and engagement section and with regard to the weight-optimized design of the arm element.

It is particularly preferably provided that the arm element is, in the region of its pivotable suspension, of plane-symmetrical form with respect to a link central plane, wherein the holding section is of plane-symmetrical form with respect to a holding central plane which is preferably parallel to the link central plane, wherein the holding central plane and the link central plane are spaced apart from one another by an offset. The arm element preferably has, at its first, distal end, a bearing eyelet at which said arm element can be pivotably or rotatably fixed to the frame of a utility vehicle. At least in the region of said pivotable fixing to the frame of the utility vehicle, the arm element is of plane-symmetrical form with respect to a link central plane. The holding section is preferably of plane-symmetrical form with respect to a holding central plane, which in other words runs through the center of the greatest extent of the holding section. By means of the spacing of the holding central plane from the link central plane, it is possible in particular to set the offset of the mounting region for an air spring for optimum utilization of the structural space in the region of the wheel suspension arrangement of the utility vehicle.

In a particularly preferred embodiment, the offset is in a ratio of 0.05 to 0.6, preferably of 0.1 to 0.5 and particularly preferably of approximately 0.25 to 0.35 in relation to the extent of the arm element transversely with respect to the link central plane in a region of the pivotable suspension of the arm element. The extent of the arm element transversely with respect to the link central plane in the region of the pivotable suspension is thus, in other words, the width of the arm element in the region of the suspension, or of the preferably provided bearing eyelet. The width of the arm element in said region is preferably a reference for the width of the arm element in the further profile along the link central plane. The link central plane of the arm element particularly preferably defines the position thereof relative to the running gear system of a utility vehicle, and the offset between the holding central plane and the link central plane is thus simultaneously an indication of the position of the fastening region of the load-bearing element relative to the running gear system. The particularly preferred range of 0.05-0.6 for the ratio of the offset in relation to the width of the arm element has in this case proven to be suitable in all of the link unit variants tested by the applicant, in particular for a multiplicity of different utility vehicle running gears. In the range of a ratio of 0.1-0.5, it is preferably possible for air springs of different size to be provided on load-bearing elements of identical type of construction by virtue of the holding section simply being displaced into a respectively optimum position in relation to the link central plane axis. The particularly preferred range of 0.25-0.35 has, in the context of the present invention, proven to be a common variant for the majority of utility vehicles on the market, and thus the link unit in the context of the present invention also permits the possibility of retrofitting in such utility vehicles. An offset of 30 mm, or alternatively preferably 60 mm, is preferably provided, wherein a multiplicity of usage possibilities for the link unit in already existing utility vehicles is realized without the need to make further structural changes to the rest of the running gear geometry.

The load-bearing element particularly preferably has a support surface which is designed to be supported on an axle tube, wherein the load-bearing element is held by way of the positively locking engagement on the holding element and the support of the support surface on the axle tube. In addition to the arm element, the load-bearing element preferably also has a surface by which it can be supported on, or preferably fixed to, an axle tube. The support surface of the load-bearing element is in this case advantageously adapted to the outer geometry of the axle tube such that said support surface can bear against the axle tube over as large an area as possible. In interaction with the engagement between the holding section and the engagement section fixed to the load-bearing element, it is thus preferably possible for the axle tube to be arranged, in regions, between the arm element and the load-bearing element, and to be positioned between the respective elements already before a welded connection is produced. In this way, the production of the link unit can be simplified considerably, as the three components involved, the arm element, load-bearing element and axle tube, are held in positively locking fashion in their final position already before the welded connection is produced, wherein subsequently, all of the welded connections between the individual elements of the link unit can be produced.

It is preferably provided that a first welding section and a second welding section are provided on the arm element, wherein, in the first welding section and in the second welding section, a welded connection can be produced, or preferably is produced, between the arm element and the axle tube. In the context of the present invention, it has proven to be advantageous for provision to be made of two substantially mutually spatially separate welding sections, that is to say first and second welding sections, and thus two preferably mutually separate weld seam regions at which the arm element can be, or preferably is, fixed to the axle tube. Owing to the spatial separation of the two welding sections, it is possible in particular to avoid a stress concentration in the region of the side seams when the connection between the arm element and axle tube is subjected to load, and it is thus possible for a longer service life to be realized and for greater maximum forces to be transmitted from the arm element to the axle tube and vice versa. At the same time, with the present invention, it is possible for the profile, or in other words the geometry, of the first and second welding sections to be optimized such that these are adapted to an optimum force flow between arm element and axle tube. In particular, it is possible for rounded side seam geometries to be provided, in the case of which the effect of the material hardening in the region of a side seam can be utilized in order to increase the strength of the connection between arm element and axle tube and at the same time prevent the risk of brittle fracture.

Also provided according to the invention is a method for producing a link unit, comprising the steps: providing an arm element and a load-bearing element, wherein the arm element has a holding section and wherein the load-bearing element has an engagement section; producing positively locking engagement between the holding section and the engagement section; producing a cohesive connection between the arm element and the load-bearing element in the region of the holding section and of the engagement section and/or between the arm element and an axle tube. In the context of the present invention, it is particularly preferably the case that the positively locking engagement between the holding section and the engagement section is produced before the production of the cohesive connection between the load-bearing element and the arm element. The method according to the invention is characterized in particular in that the positively locking engagement between the holding section and the engagement section, and thus between the arm element and the load-bearing element, can be produced in a particularly simple manner by virtue of the engagement section simply being introduced with detent action into the holding section. In this way, for the production of the link unit, it is possible for the positively locking engagement to initially be produced by a technician without the further use of tools, wherein, after the production of the positively locking engagement, the arm element and the load-bearing element are preferably already fixed in the position in which a cohesive connection will subsequently be produced between the two elements, or between the arm element and an axle tube. The holding section and the engagement section thus function as positioning aids for the fixing of the two elements of the link unit. It is preferably furthermore the case that, between the arm element and the load-bearing element, there is arranged an axle tube which is likewise fixed relative to the arm element and relative to the load-bearing element as a result of the production of the positively locking engagement. It is thus preferably possible, in a first method step, for all of the structural units of the link unit to be held relative to one another by positively locking engagement in a position in which, subsequently, in a single second method step, all of the weld seams between the arm element and the load-bearing element and between the axle tube, the arm element and the load-bearing element can be produced.

The positively locking engagement particularly preferably acts along a holding plane and is produced by displacement of the load-bearing element relative to the arm element transversely with respect to the holding plane. In this case, the holding section is particularly preferably a projection which protrudes out of the holding plane and with which the load-bearing element can, by way of its engagement section, be placed in engagement by way of a displacement of the load-bearing element transversely with respect to the holding plane. In particular, it is preferably the case that no additional tools or additional fixing aids are necessary for the positively locking fixing of the load-bearing element to the arm element. Here, it is particularly preferably the case that the load-bearing element on the arm element is, by the action of gravitational force, prevented from passing out of engagement with the holding section again transversely with respect to the holding plane.

The cohesive connection between the load-bearing element and the arm element is particularly preferably produced by way of a thermal welding process. In this case, in the context of the present invention, a protective-gas welding process has proven to be particularly expedient as this makes it possible to realize the highest weld seam quality and particularly uniform heating in the region of the weld seams, whereby thermal stresses in the material of the link unit can be reduced.

It is particularly preferably the case that, after the production of the cohesive connection in the region of the holding section and of the engagement section, an axle tube is fixed to a first welding section and/or to a second welding section of the arm element. Here, it is particularly preferably the case that the three components of arm element, load-bearing element and axle tube are already placed in position relative to one another, wherein the cohesive connection between the holding section and the engagement section is however produced first, particularly preferably by way of a welding process, and wherein the arm element is subsequently welded to the axle tube. In this case, the first welding section and/or the second welding section of the arm element are/is particularly preferably in the form of a recess, wherein a weld seam between the axle tube and the arm element can be produced along the inner edge of said recess.

It is alternatively preferable for the cohesive connection between the arm element and the load-bearing element to be produced in the region of the holding section and of the engagement section only after the arm element and/or the load-bearing element have been cohesively fixed to the axle tube. In this way, the positive locking between the holding section and the engagement section is not adversely affected by softening during a welding process. It is particularly preferably possible for the welded connection between the axle tube and the arm element, and between the axle tube and the load-bearing element, to be produced while the positive locking between the holding section and the engagement section secures the precise positioning between the load-bearing element and arm element. Finally, it is then also possible for a welded connection to be produced between the arm element and the load-bearing element in the region of the holding section and of the engagement section.

Further advantages and features of the present invention will emerge from the following description of preferred embodiments with reference to the appended figures. It is self-evident that individual features which are realized only in one of the embodiments shown may also be used in other embodiments, unless this is ruled out explicitly or owing to technical circumstances.

DETAILED DESCRIPTION OF THE PREFERRED EMBODIMENTS

Figure 1:
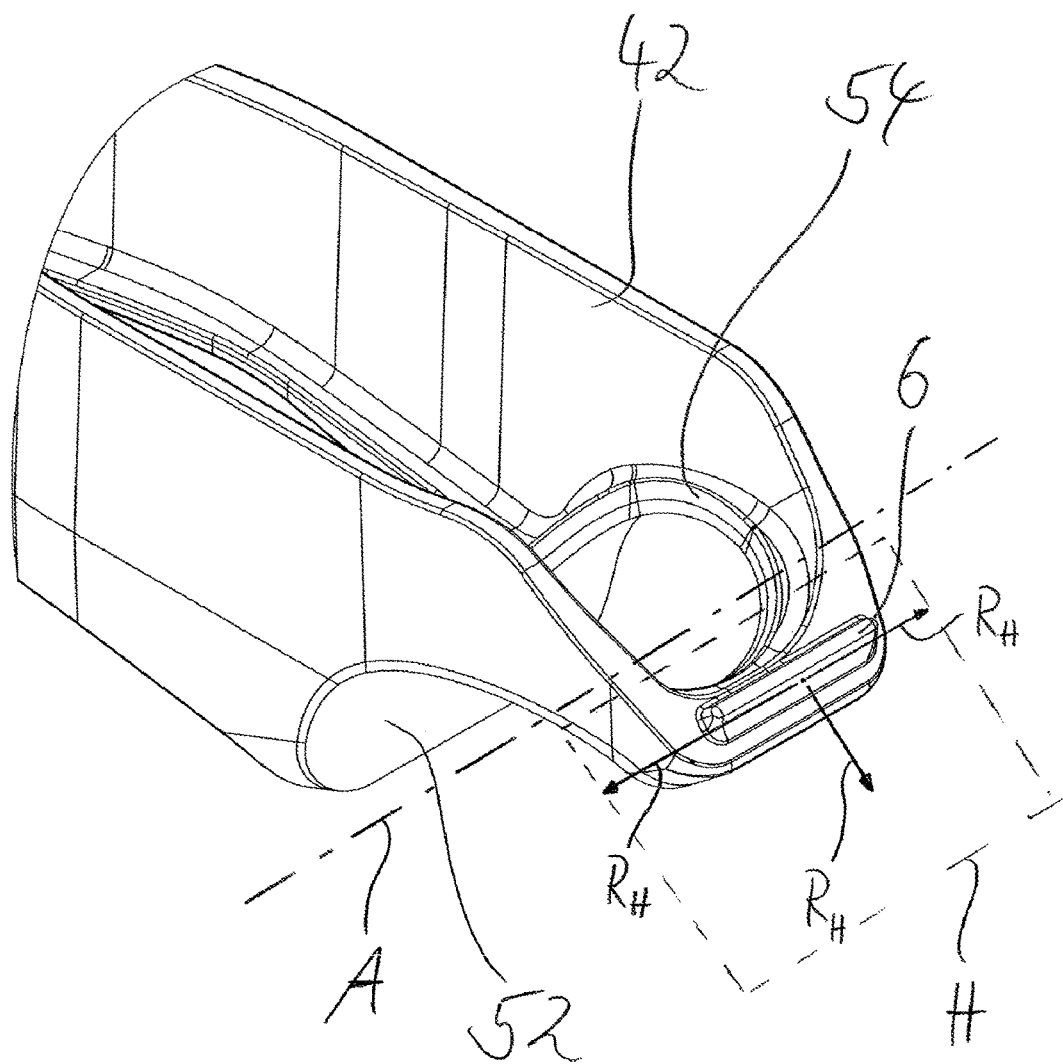
FIG. 1 shows a perspective view of a preferred embodiment of the arm element according to the invention.

FIG. 1 shows a preferred embodiment of the arm element 42 according to the invention. The arm element preferably has a joining region for the mounting of an axle tube 2 (not shown). Said joining region at least regionally extends so as to be curved uniformly about a tube axis A. In this case, the joining region is in particular designed to bear over as large an area as possible against an axle tube 2. Adjacent to the joining region, the arm element 42 has a holding section 6 which preferably extends substantially along or parallel to the tube axis A. The holding section 6 preferably protrudes from a holding plane H, wherein the holding plane H is oriented substantially parallel to the surface of the arm element 42 in the region of the holding section 6. The holding plane H is in this case particularly preferably oriented so as to be pivoted relative to the horizontal, such that a load-bearing element 44 (not shown) engaging on the holding section 6 is held on the arm element 42 by the action of gravitational force and by positively locking engagement with the holding section 6. The holding section 6 preferably secures a load-bearing element 44 (not shown), which engages thereon, against displacement along or parallel to the holding plane H and at least 3 holding directions $R_H$. In this case, two of the holding directions $R_H$ run preferably collinearly with and oppositely to one another. Here, the two holding directions $R_H$ particularly preferably run parallel to the tube axis A. The holding section 6 particularly preferably has an elongate cross-sectional geometry, which can be seen in the embodiment illustrated in FIG. 2.

Figure 2:
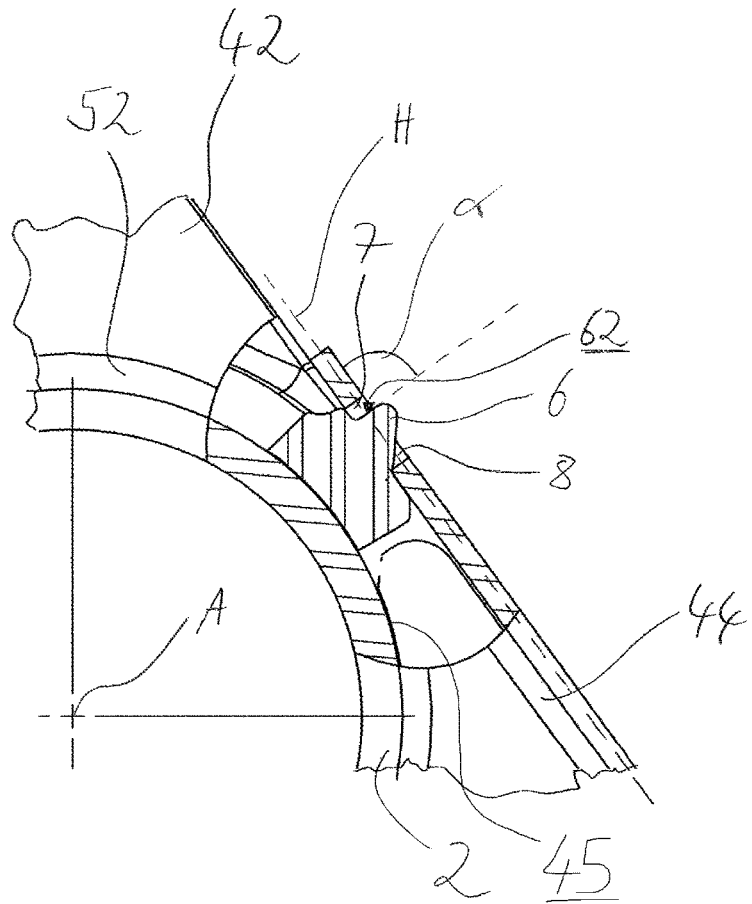
FIG. 2 shows a sectional view of a preferred embodiment of the link unit according to the invention.

FIG. 2 shows a sectional view of the embodiment of the link unit according to the invention already illustrated in FIG. 1. In this case, the illustration shows not only the arm element 42 but also the load-bearing element 44 and the axle tube 2. Here, FIG. 2 shows in particular the position of the three components of the link unit relative to one another in which a welded connection can be produced between the components. It is possible to see, in the sectional view, the substantially wedge-shaped cross section of the holding section 6. Also shown is the holding surface 62 of the holding section 6, which holding surface is arranged so as to be pivoted at an angle α relative to the holding plane H. In the present embodiment, the angle α is approximately 85-90°. In this case, the load-bearing element 44 is arranged relative to the holding section 6 such that it is not fully in engagement with the holding section 6, but rather a gap is present between the corresponding contact surface of the engagement section 7 and the holding surface 62. Here, the arm element 42 and the load-bearing element 44 are particularly preferably each supported on the axle tube 2, wherein, after the production of the positive locking between the engagement section 7 and holding section 6, a welded connection can be produced between the axle tube 2, the arm element 42 and the load-bearing element 44. It is furthermore preferably the case that the region between the positively locking engagement of the holding section 6 and of the engagement section 7 has a welding joint 8, wherein the welding joint 8 is in particular designed for realizing a uniform distribution of welding material during the production of a welded connection between the arm element 42 and the load-bearing element 44. The load-bearing element 44 is preferably supported by way of a support surface 45 on the axle tube 2, and can particularly preferably be welded to the axle tube 2 along said support surface 45.

Figure 3:
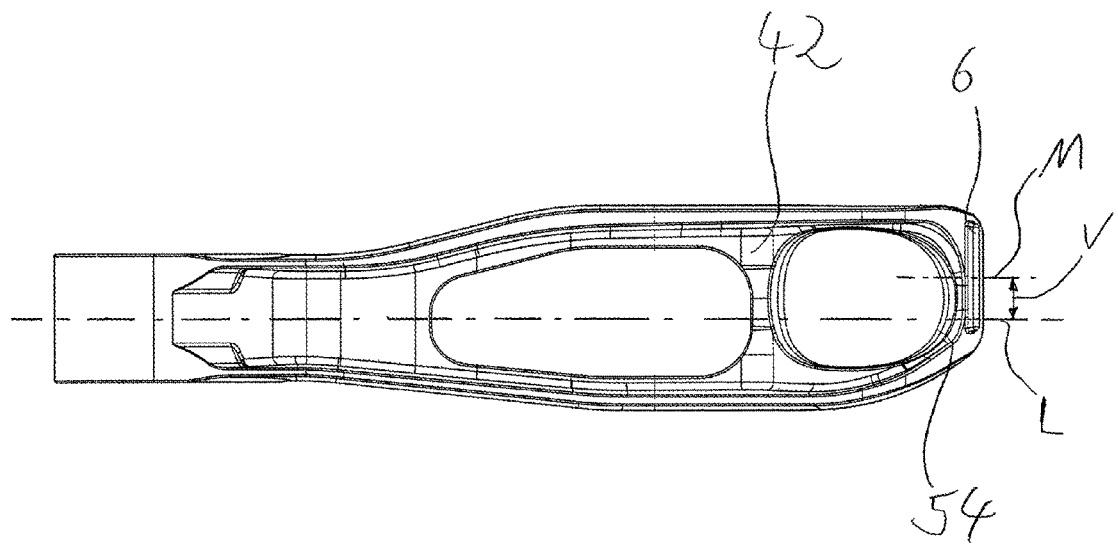
FIG. 3 shows a plan view of a preferred embodiment of the link unit according to the invention.

FIG. 3 shows a plan view of a preferred embodiment of the arm element 42. In this case, the region for the pivotable suspension of the arm element on the frame of a utility vehicle is preferably provided at the left-hand side of the arm element 42. In said region, the arm element 42 preferably extends in plane-symmetrical fashion with respect to a link central plane L. It is also shown that the holding section 6 extends in substantially plane-symmetrical fashion with respect to a holding central plane M, wherein the holding central plane M is spaced apart from the link central plane L. The holding central plane is particularly preferably oriented parallel to the link central plane L. The offset V between the holding central plane M and the link central plane L is in this case in a particularly preferred ratio of 0.2-0.3 relative to the width of the arm element 42 in the region of its pivotable mounting. Furthermore, FIG. 3 illustrates the second welding section 54 of the arm element 42, which is preferably in the form of a recess, and along the inner edge of which a welded connection to an axle tube 2 (not shown) can be produced.

REFERENCE SIGNS

6—Holding section
7—Engagement section
8—Welding joint
42—Arm element
44—Load-bearing element
45—Support surface
52—First welding section
54—Second welding section
62—Holding surface
α—Holding angle
H—Holding plane
L—Link central plane
M—Holding central plane
$R_H$—Holding direction
V—Offset

The invention claimed is:

1. A link unit, comprising:
   an arm element including one of a projection and a recess; and,
   a load-bearing element including the other of the projection and the recess;
   wherein the arm element has a holding section and the load-bearing element has an engagement section;
   wherein the holding section and the engagement section are configured to be placed in positive locking engagement by inserting the projection into the recess such that the load-bearing element is secured against displacement relative to the arm element in at least three holding directions which lie in a holding plane by the positive locking engagement between the holding section and the engagement section; and
   wherein two of the holding directions run parallel to a tube axis of an axle tube configured to support vehicle wheels and that is fixed to the arm element.

2. The link unit as claimed in claim 1, wherein between the holding section and the engagement section, there is formed a welding joint for producing a welded connection between the arm element and the load-bearing element, and wherein the welded connection is separate from the positive locking engagement.

3. The link unit as claimed in claim 1, wherein the holding section comprises the projection on the arm element, and wherein the engagement section comprises the recess with which the holding section can be placed in positive locking engagement.

4. The link unit as claimed in claim 1, wherein the holding section has a first holding surface with which the engagement section can be placed in contact, and wherein the holding surface extends transversely with respect to the holding plane.

5. The link unit as claimed in claim 4, wherein, between the first holding surface and the holding plane, there is formed a holding angle which is less than 91°.

6. The link unit as claimed in claim 5, wherein the holding angle is between 45° and 90°.

7. The link unit as claimed in claim 6, wherein the holding angle is between 75° and 85°.

8. The link unit as claimed in claim 4, wherein the holding surface cooperates with the engagement section to form an undercut which acts transversely with respect to the holding plane.

9. The link unit as claimed in claim 1, wherein the extent of the holding section parallel to the tube axis is greater than that transversely with respect to the tube axis.

10. The link unit as claimed in claim 9, wherein the extent of the holding section transversely with respect to the tube axis is 0.1 to 0.85 times the extent of the holding section along the tube axis.

11. The link unit as claimed in claim 10, wherein the extent of the holding section transversely with respect to the tube axis is 0.15 to 0.4 times the extent of the holding section along the tube axis.

12. The link unit as claimed in claim 11, wherein the extent of the holding section transversely with respect to the tube axis is 0.2 to 0.3 times the extent of the holding section along the tube axis.

13. The link unit as claimed in claim 1, wherein the arm element is, in the region of its pivotable suspension, of plane-symmetrical form with respect to a link central plane, wherein the holding section is of plane-symmetrical form with respect to a holding central plane which is substantially parallel to the link central plane, and wherein the holding central plane and the link central plane are spaced apart from one another by an offset.

14. The link unit as claimed in claim 13, wherein the offset is in a ratio of 0.05 to 0.6 in relation to the extent of the arm element transversely with respect to the link central plane in the region of the pivotable suspension of the arm element.

15. The link unit as claimed in claim 14, wherein the offset is in a ratio of 0.01 to 0.5 in relation to the extent of the arm element transversely with respect to the link central plane in the region of the pivotable suspension of the arm element.

16. The link unit as claimed in claim 15, wherein the offset is in a ratio of 0.25 to 0.35 in relation to the extent of the arm element transversely with respect to the link central plane in the region of the pivotable suspension of the arm element.

17. The link unit as claimed in claim 1, wherein the load-bearing element has a support surface which is designed to be supported on the axle tube, and wherein the load-bearing element is held by way of the positive locking engagement on a holding element and the support of the support surface on the axle tube.

18. The link unit as claimed in claim 1, wherein a first welding section and a second welding section are provided on the arm element, and wherein, in the first welding section and in the second welding section, a welded connection can be produced between the arm element and the axle tube.

19. A method for producing a link unit, comprising:
providing an arm element and a load-bearing element, wherein the arm element has a holding section and wherein the load-bearing element has an engagement section;
providing an axle tube configured to support vehicle wheels and that is cohesively fixed to at least one of the arm element and the load bearing element;
producing positive locking engagement between the holding section and the engagement section; and
producing a cohesive connection between the arm element and the load-bearing element in the region of the holding section and of the engagement section, wherein the positive locking engagement between the arm element and the load bearing element secures the load bearing element against displacement relative to the arm element in at least three holding directions which lie in a holding plane, and wherein the positive locking engagement is separate from the cohesive connection.

20. The method as claimed in claim 19, wherein the positive locking engagement acts along the holding plane and is produced by displacement of the load-bearing element relative to the arm element transversely with respect to the holding plane.

21. The method as claimed in claim 19, wherein the cohesive connection is produced by way of a thermal welding process.

22. The method as claimed in claim 19, wherein, after the production of the cohesive connection in the region of the holding section and of the engagement section, the axle tube is fixed to at least one of a first welding section and a second welding section of the arm element.

* * * * *